United States Patent [19]

Kumar et al.

[11] 4,436,423

[45] Mar. 13, 1984

[54] RING LASER GYROSCOPE SUSPENSION

[75] Inventors: Shri A. Kumar, Parsippany; Bo H. G. Ljung; James G. Koper, both of Wayne, all of N.J.

[73] Assignee: The Singer Company, Little Falls, N.J.

[21] Appl. No.: 301,608

[22] Filed: Sep. 14, 1981

[51] Int. Cl.³ .............................................. G01C 19/64
[52] U.S. Cl. ........................................ 356/350; 372/94
[58] Field of Search ........................... 356/350; 372/94

[56] References Cited

U.S. PATENT DOCUMENTS 4,309,107  1/1982  McNair et al. ...................... 356/350
4,386,853  6/1983  Ljung .................................. 356/350

Primary Examiner—Vincent P. McGraw
Attorney, Agent, or Firm—Morris Liss; T. W. Kennedy

[57] ABSTRACT

A torsional hinge is axially mounted within a central bore of a ring laser gyroscope body. The hinge comprises a plurality of angularly spaced wing sections having generally radially extending slits therein for permitting torsional motion of the gyroscope about the hinge. A plurality of spaced arcuate segments bridge a gap between the wing sections and the confronting surface of the bore and are cemented to the surface for securement of the hinge. By properly dimensioning and positioning the subtending contact areas of the hinge within the bore, the effects of thermal expansion of the hinge are minimized thereby inhibiting distortion of the gyroscope body as well as path length changes with temperature.

4 Claims, 6 Drawing Figures

RING LASER GYROSCOPE SUSPENSION

FIELD OF THE INVENTION

The present invention relates to gyroscopes, and more particularly ring laser gyroscope suspensions.

BACKGROUND OF THE INVENTION

A ring laser gyroscope generally includes mirrors within centrally formed cavities for reflecting laser beams along the cavity length. A beam impinging upon a particular mirror will not be perfectly reflected due to normal irregularities on the surface of the mirrors. Rather, some back scattering occurs. This causes the beat frequency between two beams in the gyroscope to disappear at low inertial rotation input rates. This effect is referred to as lock-in which has been recognized for some time in the prior art and has been solved by driving the gyroscope body in rotational oscillation (dither). The means for accomplishing the dither conventionally includes a piezoelectric actuator connected to a suspension for the gyroscope which causes the body of the gyroscope to oscillate angularly at the suspension's natural mechanical resonant frequency. The dither is superimposed upon the actual rotation of the gyroscope in inertial space. The prior art includes various approaches to recover inertial rotation data free from dither and this does not form part of the present invention.

A number of torsional suspension systems have been devised for mounting a ring laser gyroscope so that it may be subjected to dither. One prior method for suspending the gyroscope utilizes two wagon wheel shaped torsional springs or hinges which are preloaded such that the gyroscope body is sandwiched between the hinges. Performance of such an assembly is less than optimum when subjected to a wide temperature range. Due to the mismatch between the coefficients of expansion of the materials of the hinge and the gyroscope body, as well as the high friction at the interfaces of the hinge and body, the problems of sticking/slipping occur. This results in erratic changes in path length along with large tilts leading to changes in gyroscope drift rate. Moreover, the large changes in path length with such a hinge design complicates the design of path length control transducers which must be employed to compensate for these path length changes.

A more recent prior art approach is to mount a wagon wheel torsional hinge within a central bore that is actually formed within the body of a ring laser gyroscope. Although such an arrangement has its advantages, expansion of the hinge material has been known to distort the gyroscope block and the path length with changes in temperature. Further, a wagon wheel torsional hinge configuration may lack sufficient material in the gyroscope block to counter sagittal tilt in response to thermal changes which will cause errors in the output of a gyroscope so equipped.

BRIEF DESCRIPTION OF THE PRESENT INVENTION

The present invention utilizes a single hinge cemented in a cylindrical bore formed axially through the central portion of a gyroscope body. The contact forces between the hinge and the body achieve a condition whereby the path length becomes relatively invarient in response to expansion or contraction of the hinge over the operating temperature range. The torsional hinge of the present invention comprises a plurality of angularly spaced wing sections having generally radially extending slits therein for permitting torsional motion of the gyroscope about the hinge. A plurality of spaced subtending arcuate segments bridge a gap between the wing sections and the confronting surface of the bore and are cemented to the surface for securing the hinge. By properly positioning the subtending segments of the hinge within the bore, the effects of thermal expansion of the hinge are minimized thereby inhibiting distortion of the gyroscope body as well as path length changes with temperature. Also, by utilizing a centrally mounted single hinge, instead of the dual sandwiching wagon wheel hinges described hereinbefore, stick and slip are eliminated over the operating temperature range. Further, the compact design of the present hinge still affords sufficient material to be present within the gyroscope body thus increasing the gyroscope's sagittal (or tilt) stability. All of these advantages over the prior art are present along with the advantage of lower cost of the single unit design of the present invention.

The above-mentioned objects and advantages of the present invention will be more clearly understood when considered in conjunction with the accompanying drawings, in which:

DETAILED DESCRIPTION OF THE INVENTION

Figure 1:
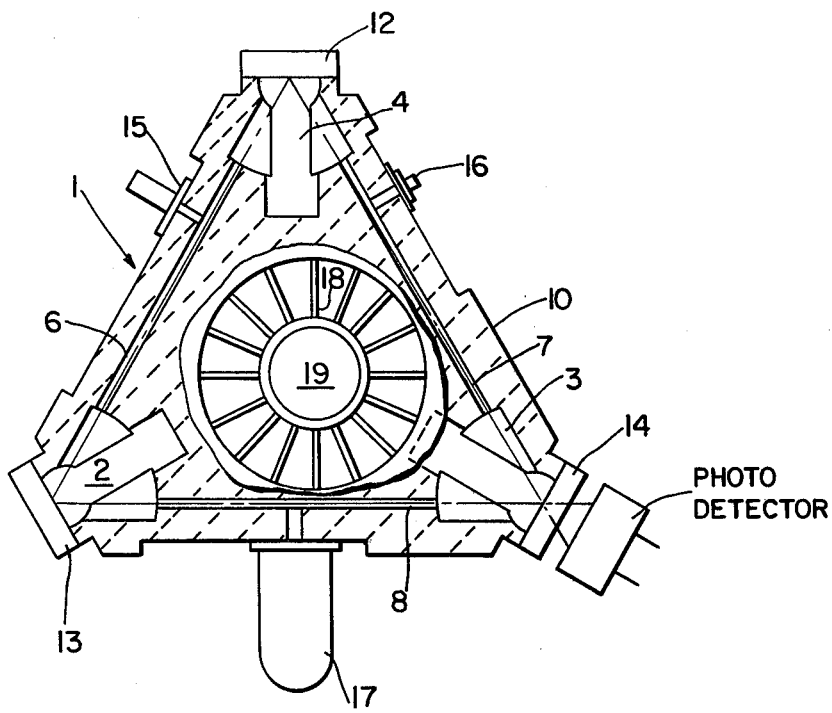
FIG. 1 is a sectional view of a prior art ring laser gyroscope.

In order to form a basis for the discussion of the present invention, reference is made to FIG. 1 which illustrates a prior art ring laser gyroscope generally indicated by reference numeral 1. The gyroscope has a triangularly shaped glass-ceramic body 10. Tubular cavity sections 6, 7 and 8 form triangular sections which contain a gas mixture such as helium and neon. Larger cavities 2, 3 and 4 interconnect the triangular sections to form a continuous cavity. A mirror 12 of high reflectivity encloses the upper corner of the gyroscope while a similar mirror 13 encloses the lower left corner. An output mirror 14 encloses the lower right corner of the gyroscope. Output mirror 14 has a conventional structure, which is well known in the art. Mirror 14 reflects light impinging upon it as well as permits the passage of light outwardly from the lower right end of the gyroscope.

A first anode 15 is mounted in the body 10 of the gyroscope and has access to the cavity section 6. A second anode 16 is similarly mounted to the body 10 of the gyroscope. A cathode 17 is mounted to the lower edge of the triangular glass-ceramic gyroscope body 10 and there is access between the cathode and the corresponding cavity section 8. Upon electrical energization of the anode and cathode electrodes, lasing of the helium neon gas mixture occurs wherein clockwise (CW) and counterclockwise (CCW) beams occur within the interconnected cavity sections 6, 7 and 8. Radial torsion hinge 18 is mounted between a support post 19 and the body 10 of the gyroscope. Due to normal irregularities on the surface of the mirrors 12, 13 and 14, a beam impinging upon a particular mirror will not be perfectly reflected to an adjacent cavity section. Rather, some back scattering occurs causing the beat frequency between the two beams to disappear at low inertial rotation input rates. This is referred to as the lock-in effect, which has been recognized for some time in the prior art. The problem has been solved by driving the gyro body 10 in rotational oscillation (dither). The means for accomplishing the dither conventionally includes a piezoelectric actuator (not shown) connected to the hinge 18 and causing the body 10 to oscillate angularly at its natural mechanical resonance frequency.

The dither is superimposed upon the actual rotation of the gyroscope in inertial space. Accordingly, it is necessary to recover inertial rotation data free from dither. A number of prior art techniques are directed to the recovery of the inertial rotation data and this does not form part of the present invention.

Figure 2A:
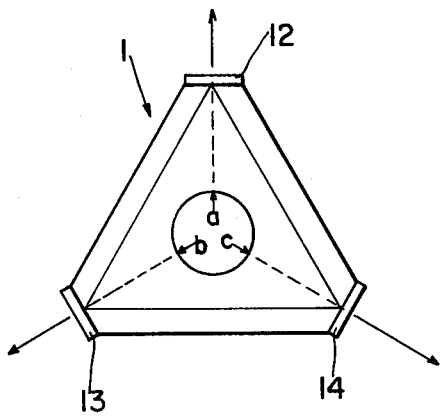
FIG. 2A is a diagrammatic view of a gyroscope suspension indicating expanding path length with temperature increases.
Figure 2B:
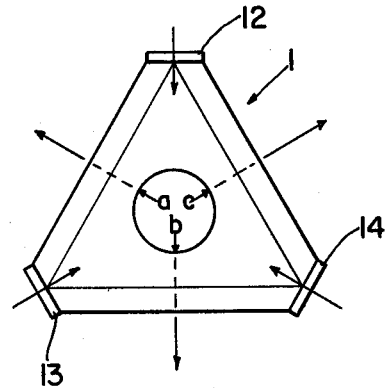
FIG. 2B is a diagrammatic view of a gyroscope suspension indicating shrinking path length with temperature increases.
Figure 2C:
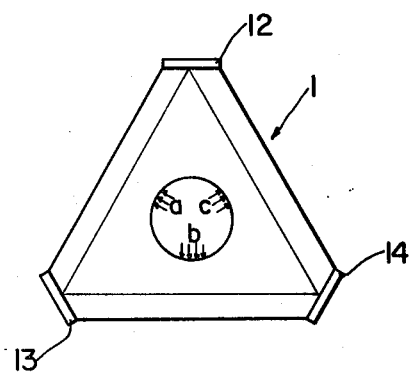
FIG. 2C is a diagrammatic view of a gyroscope suspension indicating a substantially invarient path length with temperature increases or decreases.

The points of contact between a hinge and the confronting surface of a gyroscope body are critical in considering path length changes due to temperature variations. Referring to FIG. 2A, three contact points a, b and c are seen to transmit deforming forces to the gyroscope body 1 so as to displace the mirrors 12, 13 and 14 outwardly. This unwanted effect increases as the hinge expands due to elevated operating temperatures. The opposite would occur in the event of hinge contraction due to lower operating temperatures. FIG. 2B illustrates deforming force transmission through the gyroscope block in the event the three contact points between hinge and gyroscope body are as shown by a, b and c. As will be appreciated by viewing FIG. 2B, each force a, b and c has shifted approximately 60 degrees from its counterpart in FIG. 2A. The result of the force distribution shown in FIG. 2B is that the mirrors 12, 13 and 14 are forced radially inward due to a tendency for the sides of the triangular gyroscope body to bow outwardly. The net result will be a shrinking of the path length when the hinge expands. The opposite will occur in the event the hinge contracts in response to decreasing operating temperatures. FIG. 2C illustrates a situation where the centrally located hinge has more evenly distributed forces directed from an expanding hinge to the gyroscope body. The force distribution shown in FIG. 2C results in virtually no change in path length as a result of the hinge expanding or contracting. It is this type of force distribution which is met by the present invention which will now be described in greater detail.

Figure 3:
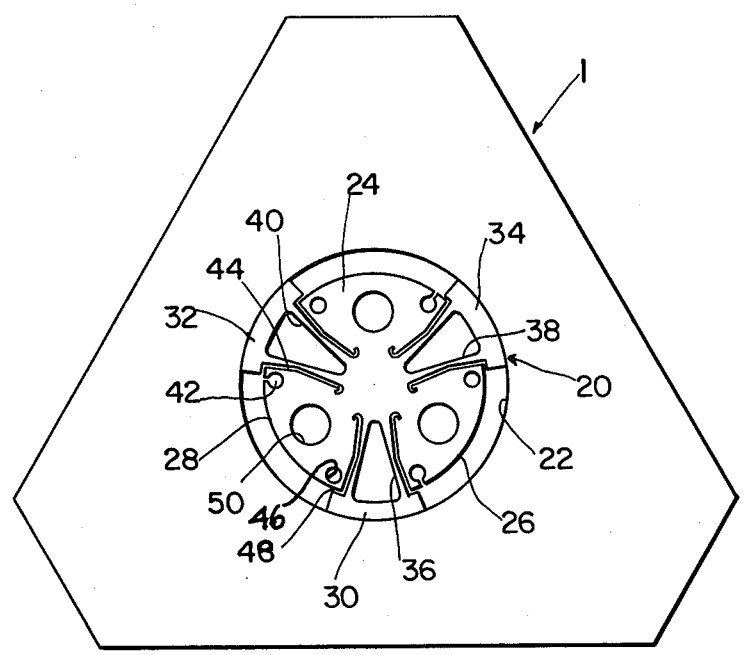
FIG. 3 is a plan view of the present ring laser gyroscope torsional hinge.
Figure 4:
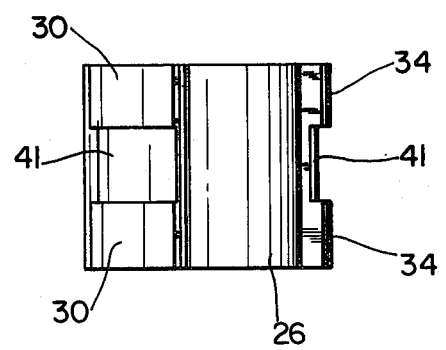
FIG. 4 is an elevational view of the present torsional hinge.

Referring to FIGS. 3 and 4, the torsional hinge 20 of the present invention is centrally positioned within an axially formed cylindrical bore 22 located at the center of the ring laser gyroscope body 1. The hinge 20 is seen to generally include three pie-shaped wing sections 24, 26 and 28 formed in a cylinder. These wing sections are symmetrical and positioned 120 degrees from one another. Bridging confronting surfaces of two adjacent wing sections are arcuate segments 30, 32 and 34 formed in the cylinder and which bridge the gap between the bore 22 and the wing sections of the hinge. Separating the confronting surfaces of the wing sections are hollowed triangular openings 36, 38 and 40.

Considering wing section 28, an annular groove 41 is formed in the cylindrical wall of each arcuate segment so that surfaces are created at the top and bottom portions of the hinge for contacting the bore 22. Generally radially extending slits 44 and 48 are seen to be formed within the material of the wing section. These slits are located immediately inwardly of the interface between the wing section and corresponding opening (40, 36). The formation of these slits within the wing sections creates the torsional spring characteristics of the hinge during dither or oscillation of the gyroscope body 1, relative to the hinge 20.

In a preferred fabrication of the hinge, the slits 44 and 48 are formed by EDM electrodes (not shown) which pass through the material of the wing sections in accordance with a conventional technique. A guide hole 42 is formed in the wing section, proximate an adjacent arcuate segment 32 which permits proper placement of an EDM guide tool. In order to retain a balanced symmetry, a second hole 46 is formed within each wing section. This hole has no other function. Enlarged openings such as 50 are formed in the central portion of each wing section so that the hinge may be secured with fasteners to a gyroscope housing (not shown) in a symmetrically balanced manner.

By properly dimensioning and positioning the contact areas of arcuate segments 30, 32 and 34, relative to the central bore 22, the even distribution of forces as discussed in FIG. 2C will be obtained. When this condition is satisfied, there will be a minimum of path length change in response to expansion or shrinking of the hinge due to changes in ambient temperature.

The optimum position of the hinge may be found by varying the angular position a bit in each direction from that shown in FIG. 3. When the optimum or null position is established, displacement in one angular direction will result in lengthening of the path length in response to hinge thermal expansion while displacement of the hinge in an opposite angular direction from the null position will result in shrinking of the path length in response to thermal expansion of the hinge.

The hinge material should include the properties of electrical insulation, ultra low thermal expansion and impermeability to helium. In a preferred embodiment, the material is Invar.

It should be understood that the invention is not limited to the exact details of construction shown and described herein for obvious modifications will occur to persons skilled in the art.

We claim:
1. A ring laser gyroscope comprising:
a generally triangular body having three apexes and an axis;
a bore axially formed in the center of the body coaxially therewith;
a generally cylindrically shaped hinge located within the bore coaxially therewith, the hinge including:
a plurality of radially extending spaced wing sections for mounting the hinge;
a plurality of arcuate segments, each segment bridging two adjacent wing sections and extending radially outwardly therefrom for contact with the bore, the segments subtending predetermined arcuate areas of contact with the bore, the segments being positioned in a preselected orientation so that the centers of the contact areas are located approximately midway between the apexes of the triangular body; and a plurality of slits longitudinally formed between the wing sections and the arcuate segments for permitting oscillating displacement of the body relative to the wing sections about the axis.

2. The gyroscope set forth in claim 1 wherein the slits extend generally radially and are disposed between adjoining radial edges of the wing sections and arcuate setments.

3. The gyroscope set forth in claim 2 wherein an arcuate groove is formed in a cylindrical wall of each arcuate segment thereby producing bore contact areas at opposite ends of the hinge.

4. A gyroscope suspension having an axis and being of generally cylindrical shape and being adapted to be coaxially positioned within a bore formed in a triangular gyroscope body of three apexes, the suspension comprising:

a plurality of symmetrically spaced arcuate segments subtending a predetermined area for fixed contact with the bore, a plurality of symmetrically spaced wing sections disposed between the segments and extending radially inwardly thereof, the segments and sections having longitudinally extending slits disposed therebetween for allowing oscillating displacement of the gyroscope body about the axis, said segments having respective openings extending radially outwardly from the axis, and said sections having openings formed therein for securing the suspension to a support of the gyroscope, and wherein said segments have arcuate areas of contact with the bore, said contact areas having centers adapted to be oriented approximately midway between the gyroscope body apexes in order to prevent changes in the pathlengths of the cavity sections of the gyroscope.

* * * * *